(12) United States Patent
Penther

(10) Patent No.: US 7,299,011 B2
(45) Date of Patent: Nov. 20, 2007

(54) LINK ADAPTATION PROCESS

(75) Inventor: Bertrand Penther, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 526 days.

(21) Appl. No.: 10/740,431

(22) Filed: Dec. 22, 2003

(65) Prior Publication Data
US 2004/0131017 A1 Jul. 8, 2004

(30) Foreign Application Priority Data
Dec. 23, 2002 (EP) .................. 02293222

(51) Int. Cl.
*H04B 17/00* (2006.01)
(52) U.S. Cl. .................. 455/67.13; 455/39; 455/456.1; 370/332; 370/469
(58) Field of Classification Search .................. 455/39, 455/67.13, 404.2, 456.1, 525; 370/208, 252, 370/310, 332, 333, 338, 469
See application file for complete search history.

(56) References Cited

U.S. PATENT DOCUMENTS

2005/0175071 A1* 8/2005 Hofmmann et al. ........ 375/145

FOREIGN PATENT DOCUMENTS

| EP | 1 176 750 | 1/2002 |
|---|---|---|
| FR | 2 742 613 | 6/1997 |
| WO | WO 02/33875 | 4/2002 |

OTHER PUBLICATIONS

K. Balachandran, et al., IEEE Journal on Selected Areas in Communications, vol. 17, No. 7, XP-000834946, pp. 1244-1256, "Channel Quality Estimation and Rate Adaptation for Cellular Mobile Radio", Jul. 1999.
M. Lampe, et al., OFDM Workshop 2002, 'Online!, www.comnets.rwth_aachen.de/{cover/publications/InOWo_September_2002_TUHH.pdf, XP-002237207, 5 pages, "Per-Prediction for Link Adaptation in OFDM Systems", Sep. 10, 2002.

* cited by examiner

*Primary Examiner*—Nay Maung
*Assistant Examiner*—Tuan H. Nguyen
(74) *Attorney, Agent, or Firm*—Oblon, Spivak, McClelland, Maier & Neustadt, P.C.

(57) ABSTRACT

The link adaptation process for selecting a physical layer mode used on a radio link for transmitting symbols of a message between two stations of a wireless communication system among a set of potential physical layer modes comprises the steps of: —evaluating the current radio link conditions; and switching from a current physical layer mode to another physical layer mode by applying a criteria depending on the evaluated current radio link conditions. The evaluation step of the current radio link conditions comprises the calculation of a received modulation accuracy (RMA) for at least a part of the message, the received modulation accuracy (RMA) being de\-fined as the inverse of the expectation of a quadratic error for a predetermined number of symbols between demodulated received symbol values and ideal symbol values and in that the criteria is at least partially dependent on the calculated received modulation accuracy (RMA).

19 Claims, 7 Drawing Sheets

LINK ADAPTATION PROCESS

BACKGROUND OF THE INVENTION

1. Field of the Invention

The invention concerns a link adaptation process.

2. Discussion of the Related Art

In known wireless communication systems, information are transmitted via the air interface between two entities of the systems via the physical layer following the ISO-OSI model.

Depending on the current radio link conditions, several physical layer modes can be selected. A physical layer mode specifies a coding rate and modulation conditions. A link adaptation process is implemented for selecting the physical layer modes (PHY modes).

For example, such a link adaptation process is necessary in a High PErformance Radio Local Area Network type 2 (HIPERLAN/2) standard. In the following, the HIPERLAN/2 standard will be used often as an example of framework to describe the context of the invention. However, the field of application of this invention goes beyond the boundaries of the HIPERLAN/2 standard and can be considered for any wireless communication system implenting a link adaptation process.

The Hiperlan/2 standard defines PHYsical (PHY) and Data Link Control (DLC) layers. The link adaptation process is part of the DLC layer.

The air interface is based on dynamic Time-Division Multiple Access (TDMA) with Time-Division Duplex (TDD). Orthogonal Frequency Division Multiplexing (OFDM) has been selected as modulation scheme for H/2 due to its good performance on frequency-selective fading channels. BPSK (Binary Phase Shift Keying), QPSK (Quaternary Phase Shift Keying), 16QAM (16 points Quadrature Amplitude Modulation) and 64QAM (64 points Quadrature Amplitude Modulation) (optional) are the supported sub-carrier modulation schemes.

The link adaptation process selects the PHY modes by implementing a criteria dependent on the radio link conditions.

In the known link adaptation processes, the criteria implemented for switching between the PHY modes considers the Signal-to-Noise Ratio (SNR) or Signal to Noise and Interference Ratio (SINR) as an input.

The PHY modes are selected to obtain an acceptable Bit Error Rate (BER) or Packet Error Rate (PER) which is necessary for the communication depending on the type of data which are transmitted.

The criteria is adapted to select a PHY mode which is able to obtain a requested BER performance considering the current measured SNR or SINR.

In fact, the measured SINR is an averaged SINR since the channel is a time-varying channel. Besides, the relation between the SINR and the BER is not straightforward because it is also very dependent on the transmission channel.

A way to implement the SINR criteria approach is to consider the typical "worst-case" scenario for the channel.

Namely, the prediction of the BER according to the SINR measured will lead to the averaged "worst-case" propagation channel to be used as reference. The thresholds used to select the PHY modes are determined accordingly.

However, information on the SINR combined with information on the channel profile would enable to determine more accurately the BER performance. Indeed, the BER and PER performance does not only depend on SINR but also on the characteristics of the frequency selective fading channel.

A solution to this problem is proposed in "Misunderstandings about link adaptation for frequency selective fading channels", M. Lampe et al., PIMRC conference, September 2002. This document suggests a link adaptation process based on the SINR with statistics on the type of fading channel.

The problem mentioned in this document is how to predict the PER or BER taking into account SINR and channel statistics.

The type of channel statistics mentioned explicitly is the estimate variance of the absolute value of the channel response in the frequency domain:

$$I_{var} = \frac{1}{N} \sum_{i}^{N} (|\rho_i| - |\overline{\rho}|)^2$$

where $\rho_i$ is the channel coefficient (fading channel response in the frequency domain) of the $i^{th}$ sub-carrier of the OFDM signal.

However, the results presented in this article on FIG. 10 are only for the particular channel A of Hiperlan/2 standard and therefore it is difficult to understand how this criteria can be effectively used to become independent from knowledge a-priori of the fading channel.

SUMMARY OF THE INVENTION

The aim of the invention is to provide a link adaptation process that can be computed easily and which uses the channel profile properties without being dependent on the a-priori knowledge of the fading channel.

Accordingly, the subject matter of the invention is a process according to claim 1.

The association of a specific metric called Error Vector Magnitude or more precisely of its inverse Receive Modulation Accuracy (RMA) representative of fading channel statistics with a system employing a set of different modulations and/or coding rates called PHY modes, which enables to derive a link adaptation technique which does not require any a-priori knowledge or hypothesis on the said channel.

Indeed, by simulation results, we observed that the relationship between the BER (Bit Error Rate, or PER) and the RMA is almost independent of the channel profile (contrary to the relationship between BER and SINR).

As a result, the RMA can be used to select the PHY mode, independently of the knowledge of channel profile.

In particular implementations, the process includes some features of sub-claims.

The invention also concerns a wireless communication system and a receiver as defined in claims 18 and 19.

BRIEF DESCRIPTION OF THE DRAWINGS

The invention will be better understood on reading the following description, given namely by way of example and whilst referring to the drawings, in which.

DETAILED DESCRIPTION OF THE INVENTION

Figure 1:
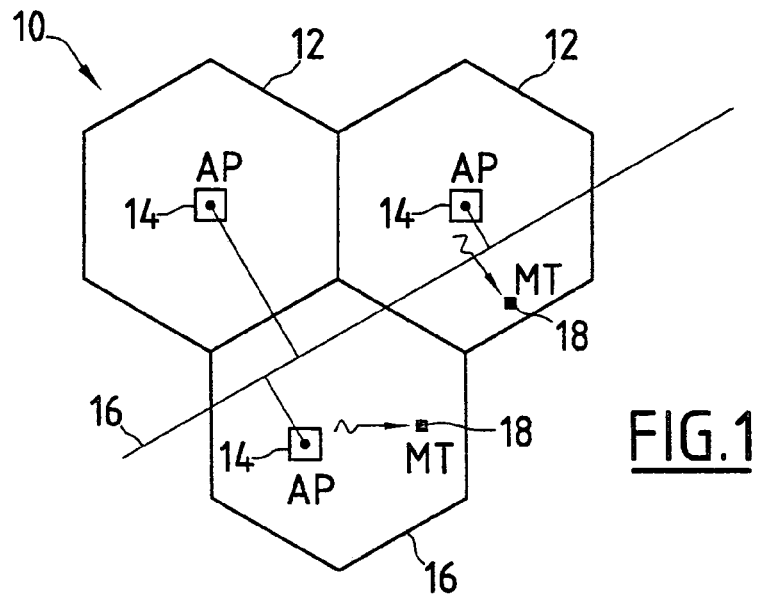
FIG. 1 is a diagrammatical view of a communication system

FIG. 1 shows a cellular system 10 having adjacent radio cells 12. Each radio cell 12 is controlled by a central access point (AP) denoted 14. The access point covers a certain geographical area and is attached to a core network 16.

Mobile terminals (MT) denoted 18 communicate with other mobile terminals 18 or the core network 16 via the access point associated with the cell 12 in which the mobile terminal is located.

The access to the medium and the assignment of radio resources to mobile terminals 18 are controlled by the associated access point 14.

As mentioned previously, the system can be assumed to be in accordance with Hiperlan/2 standard as an example only to illustrate the invention. Indeed, the scope of the invention goes beyond the boundaries of the HiperaLAN/2 standard as well as similar standards like the North American IEEE802.11a and Japanese HisWANa.

Hiperlan/2 standard is defined in ETSI TS 101 475 V1.2.1A (2000-04), "Broadband Radio Access Networks (BRAN)"; HIPERLAN Type 2; Physical (PHY) layer, April 2000.

The transmission between an access point 14 and the mobile terminals 18 is using dynamic Time-Division Multiple Access (TDMA) with Time-Division Duplex (TDD). Orthogonal Frequency Division Multiplexing (OFDM) has been selected as modulation scheme for Hiperlan/2.

The resource allocation is centralised in the access points 14. Consequently, resource should be requested prior to actual transmission of their Protocol Data Units (PDU) by mobile terminals transmitting via the uplink phase. A specific type of signalling/control message, a Resource Request (RR), encapsulated in a short PDU (SCH-PDU) is used for that purpose.

For allocation of resources the access, point 14 receives information from the mobile terminals in the associated radio cell.

The unit to be transmitted via the physical layer of Hiperlan/2 are bursts of variable length. For convenience and to reduce overhead, MAC PDU trains are exactly mapped on physical bursts. Each burst consists of a preamble followed by payload part comprising the data.

According to the Hiperlan/2 standard, the physical layer provides several physical layer modes (PHY modes) corresponding to different coding rates and modulations combinations. Several sub-carrier modulation schemes are implemented depending on the physical layer modes.

The following table lists the possible physical modes.

TABLE 1

| PHY Mode | Physical layer bit rate | Number of OFDM symbols used to encode one LCH-PDU |
|---|---|---|
| BPSK ½ | 6 Mbps | 18 |
| BPSK ¾ | 9 Mbps | 12 |
| QPSK ½ | 12 Mbps | 9 |
| QPSK ¾ | 18 Mbps | 6 |
| 16QAM$^{9/16}$ | 27 Mbps | 4 |
| 16QAM ¾ | 36 Mbps | 3 |
| 64QAM ¾ | 54 Mbps | 2 |

Basically, the number of OFDM symbols needed to encode a PDU is proportional to the robustness of the modulation. One OFDM symbol has a fixed duration of 4 μs.

Due to the plurality of PHY modes, the access point implements a link adaptation process for selecting the PHY modes depending on the radio link conditions.

Each connection and its direction (uplink or downlink) can use a particular mode that can vary from one frame to the next.

The link adaptation process comprises the steps of evaluating the current radio link conditions and switching from a current physical layer mode to another physical layer mode by applying a criteria depending on the evaluated current radio link conditions. The evaluation step of the current radio link conditions comprises the calculation of an Error Vector Magnitude (EVM) for at least a part of the received message, the Error Vector Magnitude (EVM) being defined as the expectation of the quadratic error for a predetermined number of symbols between equalized demodulated received symbol values and ideal symbol values. The criteria is at least partially dependent on the Error Vector Magnitude (EVM) and in practice on its inverse the Receive Modulation Accuracy, RMA=1/EVM.

Figure 2:
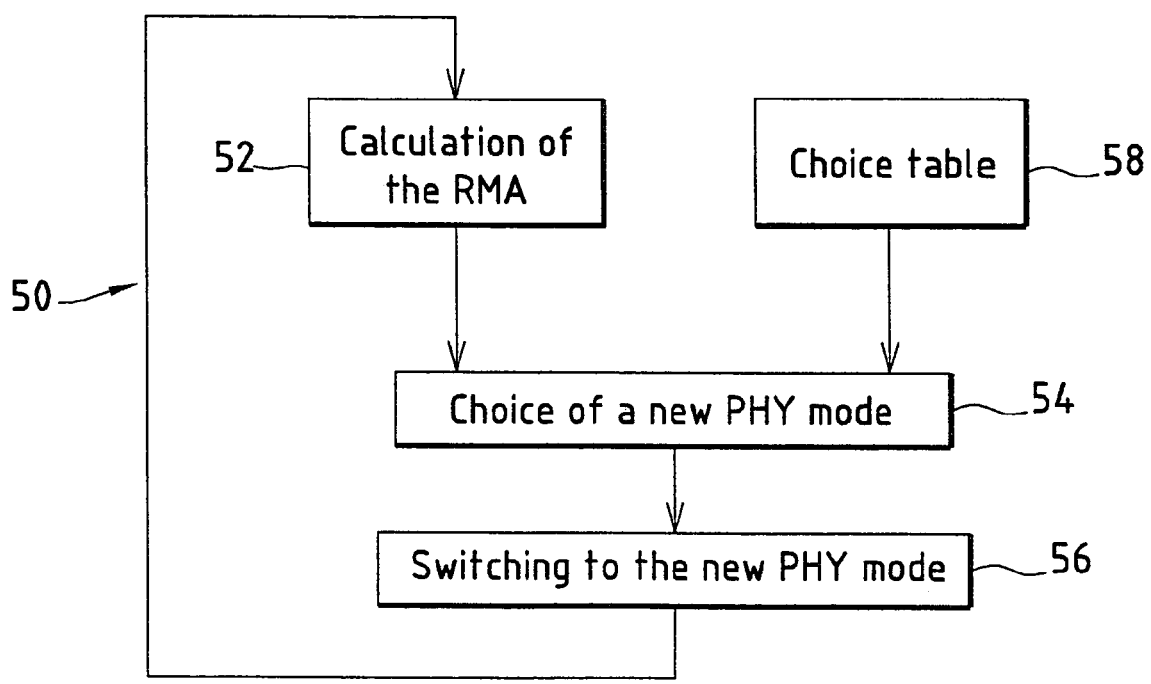
FIG. 2 is a flowchart of the link adaptation process according to the invention

FIG. 2 shows a flow chart of the algorithm of the link adaptation process according to the invention.

The following description is made for OFDM modulation scheme as implemented in Hiperlan/2 but is applicable for any modulation.

The main steps disclosed on FIG. 2 are carried out for each periodical measurement, so that a cyclic process is achieved as shown by loop 50.

According to this process, at first step 52, a Error Vector Magnitude (EVM) is calculated for each observation. Each observed symbol corresponds to a complex number (I, Q) which is shown as a point A in a diagram as on FIG. 3.

The quadratic error between a predetermined number of symbols between equalized demodulated received symbol values and ideal symbol values is defined according to the following formula:

$$\Delta^2(t,f,s) = (I(t,f,s) - I_0(t,f,s))^2 + (Q(t,f,s) - Q_0(t,f,s))^2$$

Where:

$\Delta^2(t,f,s)$ is the quadratic error for an observation depending of the time (t), frequency (f) and space (s).

$(I_0(t,f,s), Q_0(t,f,s))$ is the ideal (reference) point or symbol $A_0$ for the time (t), frequency (f) and space (s).

$(I(t,f,s), Q(t,f,s))$ is the observed point A at the time (t), frequency (f) and space (s), i.e. the equalized demodulated received symbol A.

More precisely, in the case of OFDM, if $Z(f)$ is the complex symbol on frequence f, we have $Z(f)=I(f)+jQ(f)$.

$Z_f=Z(f)$ is the equalized received symbol on sub-carrier number f.

The received symbol on sub-carrier f being denoted $R_f$, we have $$Z_f = \frac{R_f}{\rho_f},$$

$\rho_f$ being the estimated channel response on sub-carrier f.

We have also $$Z_f = \frac{R_f}{\rho_f} = T_f + \frac{n}{\rho_f}$$

where:

$T_f$ is the transmitted symbol on sub-tcarrier f; and n is the noise.

The transmitted OFDM signal is $$S_{TX} = \sum_{f=0}^{N} T(f) = \sum_{f=0}^{N} [I_{TX}(f) + jQ_{TX}(f)]$$

where $I_{TX}(f)+jQ_{TX}(f)$ is the complex transmitted signal on sub-carrier f.

The received OFMD signal after fading channel and noise is $$S_{RX} = \sum_{f=0}^{N} [\rho_f T(f) + n] = \sum_{f=0}^{N} R(f).$$

The equalisation of received OFMD signal is made indepently on each sub-carrier.

$$Z(f) = \frac{1}{\rho_k} R(f) = \frac{1}{\rho_k} [\rho_k T(f) + n].$$

The formula explains the expression of $Z_f$.

This quadratic error obtained from observation is averaged and normalised by the signal power in order to obtain a stable and more accurate value of the EVM, which is the expectation of the quadratic error:

$$EVM = E[\Delta^2(t,f,s)]$$

where $E[X]$ describes the expectation of the X variable.

The normalisation by the signal power can handled in several ways.

Namely, according to a first version of the normalisation by the power, each observation is normalised by the power $p(t,f,s)$ at the time (t), frequency (f) and space (s), then the global expectation is derived:

$$EVM = E\left[\frac{\Delta^2(t,f,s)}{p(t,f,s)}\right] \quad (1)$$

According to a second version of the normalisation by the power, the expectation of the observations is normalised by the expectation of the power:

$$EVM = \frac{E[\Delta^2(t,f,s)]}{E[p(t,f,s)]} \quad (2)$$

This second version has the advantage of being more stable since it reduces the fluctuations of the power estimates.

In principle, if the receiver includes a Automatic Gain Control (AGC) on the received signal, the average power shall be equal to 1 and then could be omitted in the computation.

The expectation of the quadratic error (respectively of the received power) can be approximated by the averaging over all observations in time (t), frequency (f) and space (s) as follows:

$$EVM = \frac{E[\Delta^2(t,f,s)]}{E[p(t,f,s)]} = \frac{\sum_{t,f,s=1}^{N(t,f,s)} \Delta^2(t,f,s)}{\sum_{t,f,s=1}^{N(t,f,s)} p(t,f,s)}$$

where $N(t,f,s)$ is the number of observations over time (t), frequency (f) and space (s).

From the EVM, the Receive Modulation Accuracy (RMA) is obtained:

$$RMA = \frac{1}{EVM} = \frac{\sum_{t,f,s=1}^{N(t,f,s)} p(t,f,s)}{\sum_{t,f,s=1}^{N(t,f,s)} \Delta^2(t,f,s)}$$

In practice, both these statistics are computed in dB:

$MER_{dB}=10Log(MER)$ $RMA_{dB}=10Log(RMA)$

As an example, the EVM computation in the specific case of Hiperlan2 can be derived according to the following formula (taking into account the second version of the normalisation by the power):

$$EVM_{Hiperlan2} = \frac{\sum_{t_1=1}^{N_f} \sum_{t_2=1}^{N_p} \sum_{s=1}^{N_s} \left[\sum_{f=1}^{K_f} \{(I(t_1,t_2,f) - I_0(t_1,t_2,f))^2 + (Q(t_1,t_2,f) - Q_0(t_1,t_2,f))^2\}\right]}{N_f N_p \cdot K_f P_0}$$

where:

$N_f$ is the number of 2 ms duration frames for the measurement;

$N_p$ is the length of the packet in the frame, in number of OFDM symbols;

$N_s$ is the number of elements spread in space in the receiver (for instance $N_s=2$ if 2 diversity antennas are used at the receiver side);

$K_f$ is the number of sub-carriers frequencies (52 for Hiperlan2);

$P_0$ is the average power of the signal and can be approximated in this case by:

$$P_0 = E[\rho^2(t_1, t_2, f)] = \frac{\sum_{t_1=1}^{N_f} \sum_{t_2=1}^{N_p} \sum_{f=1}^{K_c} \rho^2(t_1, t_2, f)}{N_f N_p \cdot K_c}$$

Where $\rho^2(t_1,t_2,f)$ is the channel estimation coefficient on sub-carrier f, in OFDM symbol $t_2$, in frame $t_1$.

There is no variation of the observations in the space domain(s) here, even though two receive antennas diversity may be employed sometimes (s=1,2).

A second version of the EVM can derived taking into account the first version of the normalisation by the power by the following formula:

$$EVM_{Hiperlan2} = \frac{\sum_{t_1=1}^{N_f} \sum_{t_2=1}^{N_p} \sum_{s=1}^{N_s} \left[ \sum_{f=1}^{K_f} \{(I(t_1,t_2,f) - I_0(t_1,t_2,f))^2 + (Q(t_1,t_2,f) - Q_0(t_1,t_2,f))^2\}/P_0 \right]}{N_f N_p \cdot K_f}$$

Where $P_0$ is the average power of the signal within an OFDM symbol and can be approximated in this case by:

$$P_0 = E[\rho^2(t_1, t_2, f)] = \frac{\sum_{f=1}^{K_c} \rho^2(t_1, t_2, f)}{K_c}$$

Where $\rho^2(t_1,t_2,f)$ is the channel estimation coefficient on sub-carrier f, in OFDM symbol $t_2$, in frame $t_1$ but with $t_1$ and $t_2$ being fixed.

Figure 6:
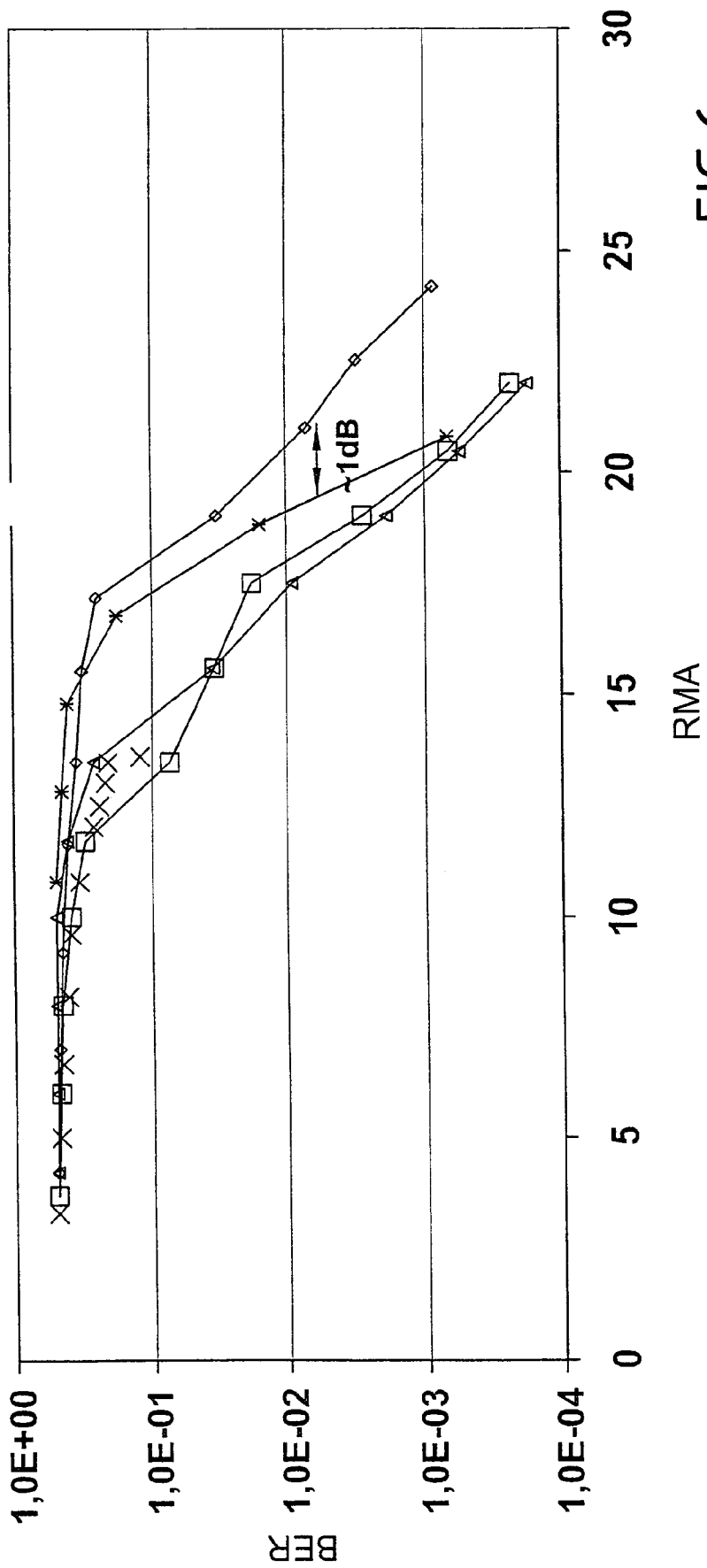
FIG. 6 is a chart showing the BER versus RMA (Receive Modulation Accuracy) for the mode 7 (64-QAM, R=¾) for several fading channels defined in Hiperlan/2.
Figure 7:
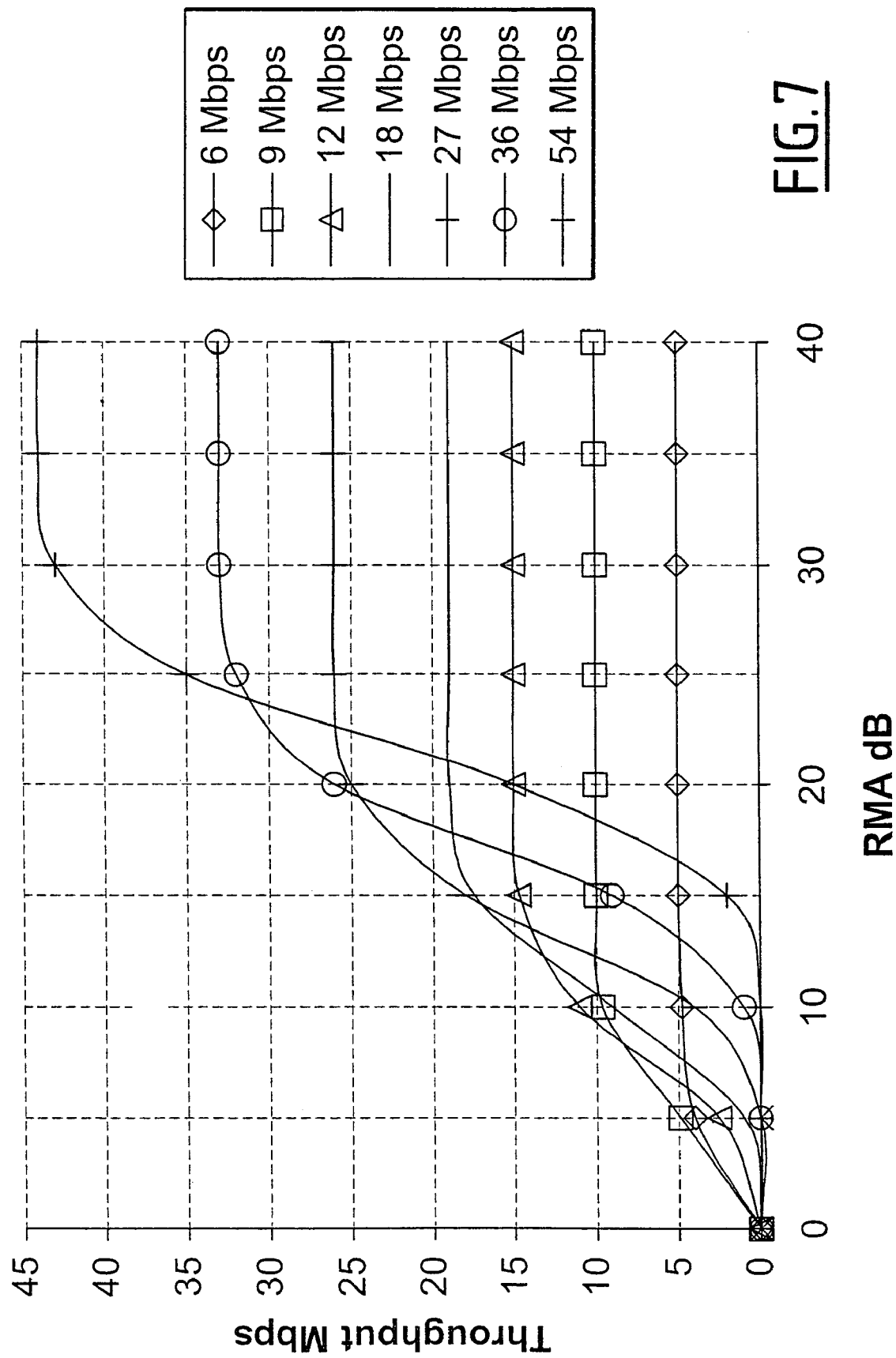
FIG. 7 is a chart showing the throughput versus RMA for a "worst-case" channel.

This last particular embodiment of the invention was used to determine the curves of FIGS. 6 and 7.

An example for the calculation of the EVM within a receiver will be disclosed later on.

The definition and calculation of the EVM (respectively the RMA) itself is know from the state-of-art and is not as such the subject of the invention. For instance, such EVM is implemented in test devices like the Vector Signal Analyser from Agilent 93000 SoC series.

Figure 3:
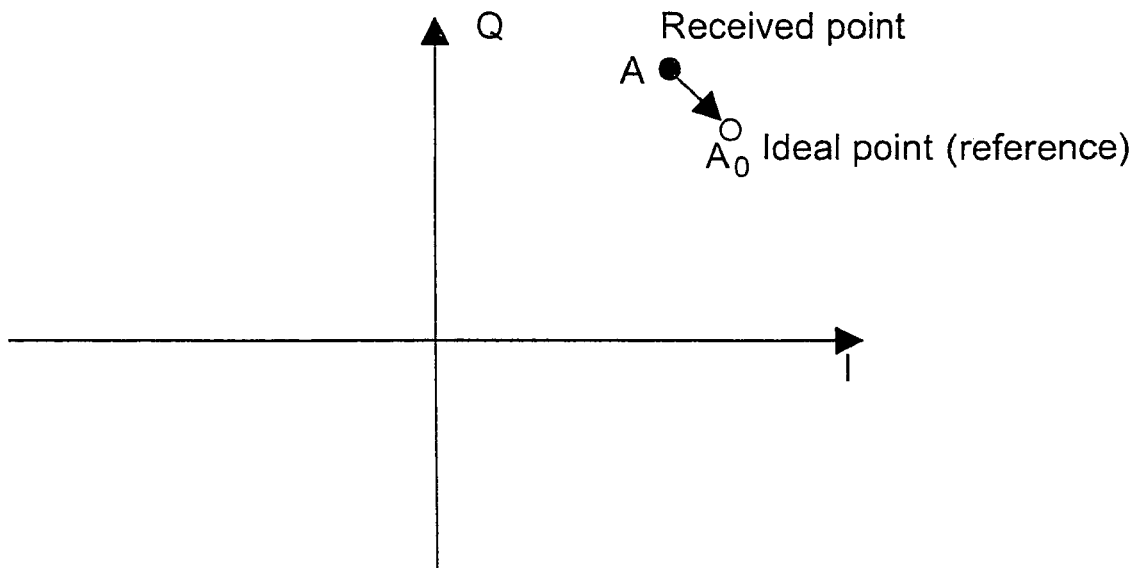
FIG. 3 is a schematical chart of a constellation having only one point explaining a first embodiment of the invention.

As shown on FIG. 3, the EVM is dependant on the distance between a received point A and an ideal point Ao.

Figure 4:
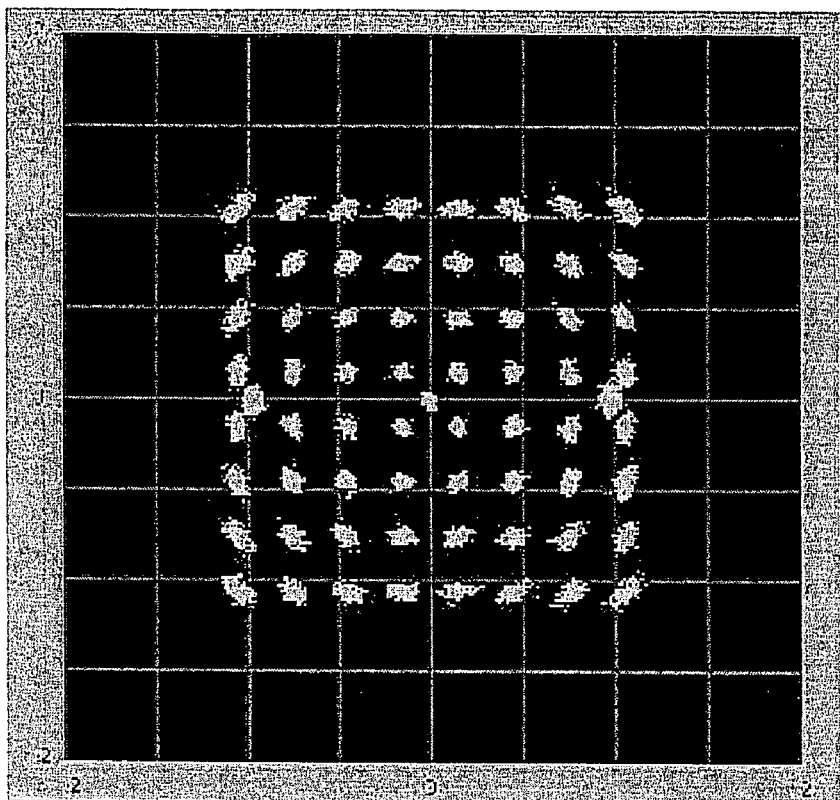
FIGS. 4 and 5 are charts showing the constellation after equalisation for two PHY modes (64-QAM and BPSK)

On FIG. 4, an example of constellation of a burst obtained after equalization for a 64-QAM (64 points Quadrature Amplitude Modulation) modulation is shown.

Figure 5:
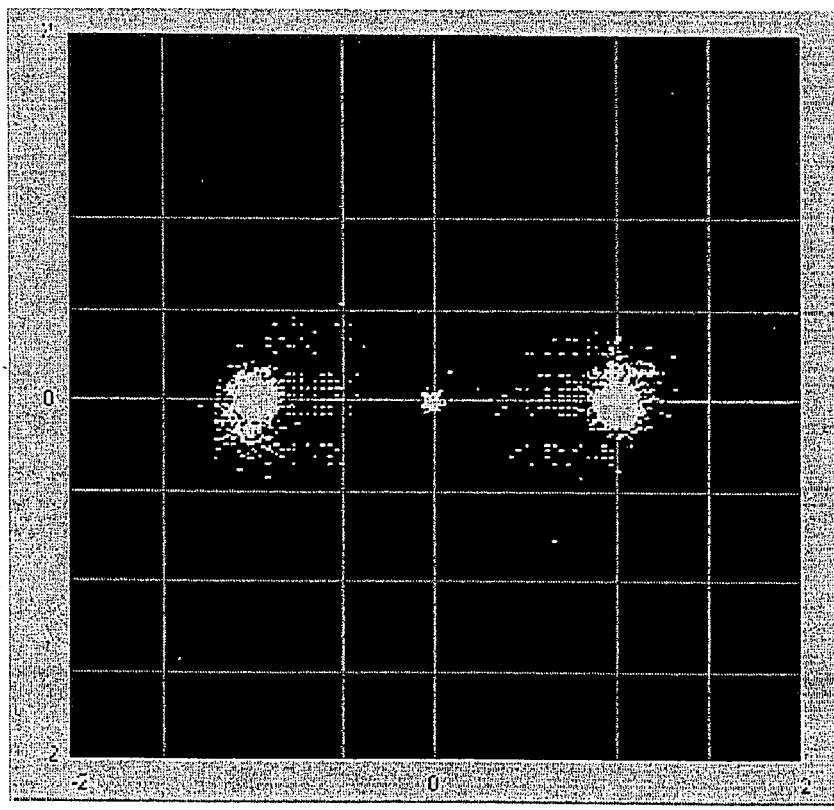

An example of the constellation obtained after equalisation for a burst is shown on FIG. 5 for a BPSK (Binary Phase Shift Keying) modulation.

On such constellations, the points get larger when both fading channel and/or noise channel impact.

Thus, basically, when the points get larger, the Error Vector Magnitude (EVM) increases and the Receive Modulation Accuracy (RMA) decreases.

At step 54, a new PHY mode is chosen in a choice table in accordance with the calculated RMA. The transmission is switched from the current physical layer mode to the new chosen physical layer mode at step 56.

The choice table is previously defined and stored at step 58.

An example of such a choice table is given here-after:

TABLE 2

| RMA | PHY mode selected |
|---|---|
| 0->3 | 0 (BPSK½) |
| 4->7 | 1 (BPSK¾) |
| 8->12 | 2 (QPSK½) |
| 13->14 | 3 (QPSK¾) |
| 15->18 | 4 (16QAM$^{9/16}$) |
| 19->24 | 5 (16QAM¾) |
| >24 | 6 (64QAM¾) |

This table defines several thresholds for the RMA. The PHY modes are selected based on these thresholds.

This table is obtained at step 58 by first considering the bit error rate (BER) versus the RMA for several channels as defined in Hiperlan/2 standard.

This diagram is shown on FIG. 6 for the mode 7 (64-QAM, R=¾) for fading channels A, C, D and E as defined in Hiperlan/2 standard and for the AWGN channel. Each curve corresponds to a different channel.

A "worst-case" propagation channel is defined based on these curves. It corresponds to the channel having the worst BER for a given RMA.

Considering this "worst-case" propagation channel, the throughput versus the RMA is drawn as shown on FIG. 7.

The throughput is defined as the bit rate obtained on top of the MAC (Medium Access Control) layer, taking into account the redundancy of retransmissions necessary to achieve packets without errors.

The selected PHY mode in table 2 is defined in order to obtain the highest throughput for each RMA.

As shown on FIG. 2, for each measurement, a choice of a PHY mode is carried out at step 54 based on the RMA calculated at step 52 taking into account the choice table previously defined and stored at step 58.

As known per se, the PHY mode is chosen individually for each DLC user connection. This, each user can simultaneously maintain several connections with different PHY modes.

Figure 8:
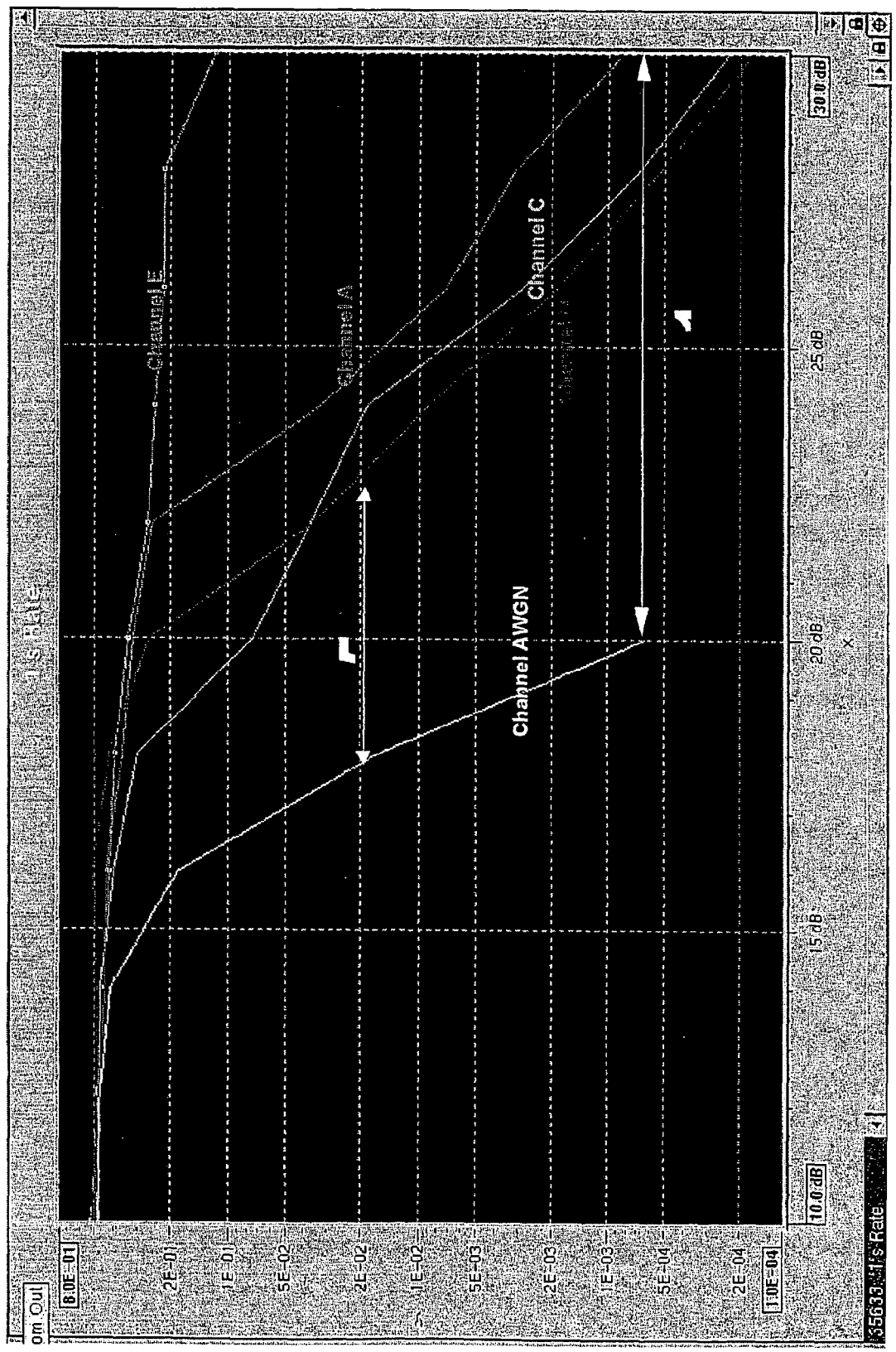
FIG. 8 is a chart showing the BER versus SINR for the mode 7 (64-QAM, R=¾) for several fading channels defined in Hiperlan/2.

FIG. 8 shows the bit error rate (BER) versus the SINR for the mode 7 (64-QAM, R=¾) as considered in the state of the art. We can observe that there is a great dispersion in dB between the AWGN channel and the fading channels A, C, D and E. Indeed there is for instance from 5 dB (at BER=$10^{-2}$) to 10 dB (at BER=$10^{-3}$) difference (depending on the BER level) between the AWGN and the channel A.

As previously explained, if the "worst-case" scenario for definition of the thresholds of the PHY mode selection process, i.e. in the present case the channel A is considered (the channel E is worse but not realistic), a loss of 5~10 dB can be experienced between the worst-case and the best-case (AWGN channel). Such a loss leads to a great loss of throughput as explained previously. Consequently, the conventional PHY mode selection process often leads to suboptimal choice with respect to the throughput.

On the contrary, FIG. 6 shows that the dispersion is largely reduced in dB between the AWGN channel and the fading channels A, C, D and E. Indeed there is only 1 dB (at BER=$10^{-2}$) to 2~3 dB (at BER=$10^{-3}$) difference (depending on the BER level) between the AWGN and the channel A.

In this situation, the "worst-case" scenario for definition of the threshold of the PHY mode selection process, would lead to a loss of 1~3 dB between the worst-case and the best-case, hence improving the throughput performance compared to the SINR criteria case.

As a conclusion, the RMA can be considered as a "equivalent-AWGNSINR", more precisely the equivalent SINR that would be required to obtain a similar Bit Error Rate on an AWGN channel.

Therefore the RMA enables, to a certain extend of course, the convergence of the BER on all transmission channels. In other words, it is possible to better predict the Bit Error Rate (BER and also PER) from the RMA, which is the purpose of the Link Adaptation process.

The calculation of the RMA is calculated in receiving device (any usual receiver of wireless communications system is compatible).

Figure 9:
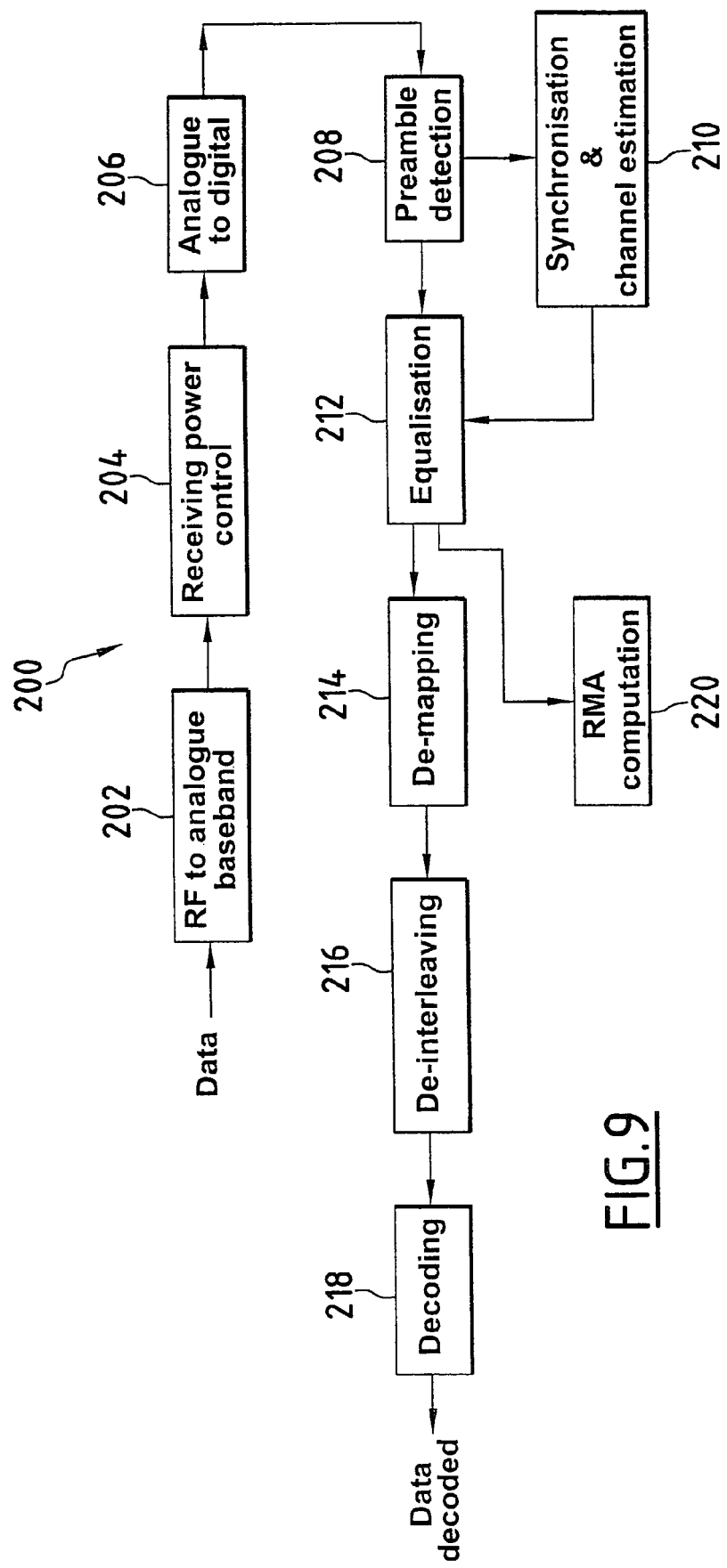
FIG. 9 is a functional view of a receiver adapted for implementing the process according to the invention.

Such a receiver 200 is shown on FIG. 9.

It includes a RF to analogue baseband conversion stage 202, a receiving power control stage 204, a baseband analogue to digital conversion stage 206, a preamble detection stage 208 (when preamble are inserted), a synchronisation in time and frequency, and channel estimation stage 210, an equalisation stage 212, a de-mapping stage 214, a de-interleaving stage 216 (if necessary) and a decoding stage 218.

The computation of the RMA is carried out by a RMA computation stage 220 on the data outputted from the equalisation stage 212 and before the demapping stage 214.

According to a first embodiment of the invention, the RMA is calculated for each burst by using the preamble structure that precedes each data burst.

The preamble is a know sequence and therefore it is easy to compare the observed sequence with the ideal sequence as described in the equation of the received modulation accuracy.

In that case, $N_f$ is the number of frames for the measurement (for instance $N_f$=20 frames enables a good averaging).

$N_p$ is the number of symbols composing the preamble of each burst (for instance 2 OFDM symbols in the case of Hiperlan2 preambles).

$K_c$ is the number of frequencies composing the preamble (for instance 52 sub-carriers in the case of Hiperlan2 preambles).

$N_s$ is the number of space diversity composing the preamble (for instance 1 or 2 in the case of Hiperlan2 preambles).

$P_0$ is the average power of the constellation (usually $P_0$=1 when an receiving or transmitting power control is employed).

In other words, ($I_0(t,f,s),Q_0(t,f,s)$) in the equation below, is known and stored in the receiver:

$$\Delta^2(t,f,s)=(I(t,f,s)-I_0(t,f,s))^2+(Q(t,f,s)-Q_0(t,f,s))^2$$

RMA over all observations:

$$RMA = \frac{1}{EVM} = \frac{\sum_{t,f,s=1}^{N(t,f,s)} p(t,f,s)}{\sum_{t,f,s=1}^{N(t,f,s)} \Delta^2(t,f,s)}$$

with $N(t,f,s)=N_f \cdot N_p \cdot K_c \cdot N_s$ (total number of observations) and $$P_0 = E[p^2(t,f,s)] = \frac{\sum_{t=1}^{Nf \cdot Np} \sum_{f=1}^{Kf} \sum_{s=1}^{Ns} p^2(t,f,s)}{N(t,f,s)}$$

(averaged power of the observations).

Therefore, on each averaging period (the length of which depends on $N_f$ and $N_p$), the Link Adaptation using the RMA criteria can be made.

According to a second embodiment of the invention, the RMA is calculated by computing on the payload part of the bursts.

Figure 10:
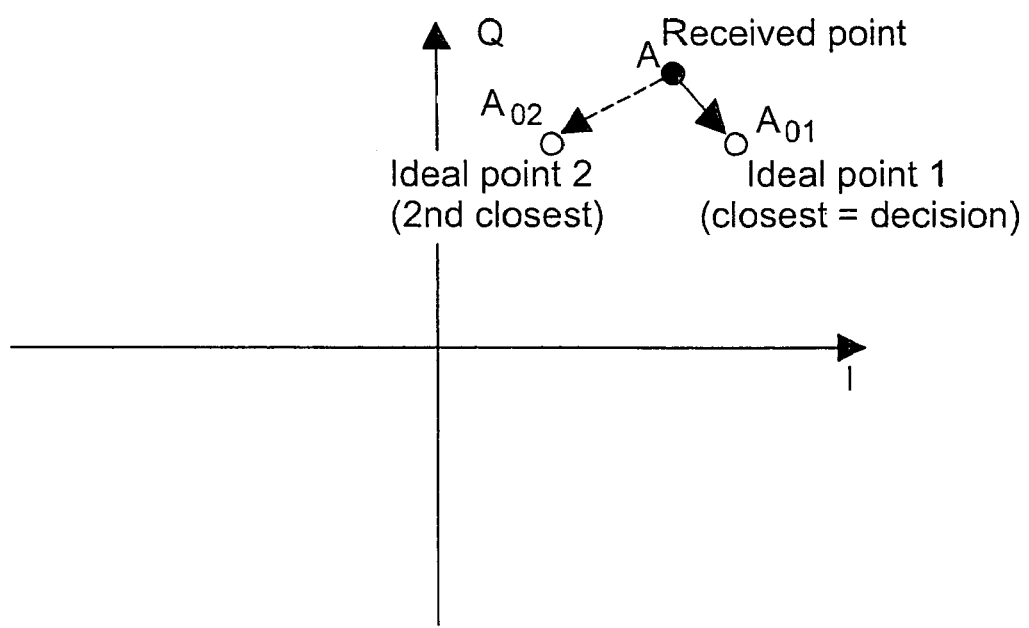
FIG. 10 is a schematical chart of a constellation having only one point explaining a second embodiment of the invention.

In that case, ($I_0(t,f,s),Q_0(t,f,s)$) is obtained from taking a decision on ($I(t,f,s),Q(t,f,s)$), the observed point after equalisation. Such calculation is more complex since it requires to take a decision on unknown payload symbols before computing the RMA. Taking a decision requires to determine the closest ideal point from the received point:

As shown on FIG. 10, a received point can be linked to several close points as Ideal point 1 or Ideal point 2.

For example the chosen ideal point is defined as the point defining with the received point a shorter length according to a known metric.

For example, the metric is defined as:

$$\Delta^2(t,f,s)=(I(t,f,s)-I_0(t,f,s))^2+(Q(t,f,s)-Q_0(t,f,s))^2$$

Therefore, such procedure requires more computational complexity and should be used only if necessary.

In other words, in that case:

($I_0(t,f,s),Q_0(t,f,s)$)=($\hat{I}(t,f,s),\hat{Q}(t,f,s)$) where the sign $\hat{x}_k$ means an estimate of $x_k$.

A more refined computation of the RMA is carried out by using the pilots possibly contained in the payload part of the message.

Indeed, as defined for instance by Hiperlan/2 standard, each data OFDM symbol contain data in data carriers and reference information in pilot carriers. Thus, each payload symbols includes 4 pilots, which are referenced samples. Therefore, it is also possible to use these 4 pilots to refine the computation of the RMA. The pilots values are known and therefore we can compare the observed sequence with the ideal sequence, like in the preamble part.

In order to limit fast variations of the RMA calculation that could result in some "ping-pong" effect, it is advisable to average the computation over several bursts or frames.

For the downlink channel, each mobile terminal computes the RMA on all type of downlink burst it receives. Mobile terminal can also take advantage of the Broadcast Channel (BCH) and Frame Channel (FCH) data (called also Long Traffic Channel LCH in Hiperlan2). Hence averaging is performed on the numerous bursts received in one frame and can also be combined by an averaging on a frame by frame basis.

For the uplink channel, it is necessary for the access point to compute the RMA separately for each connection, i.e. for each mobile terminal, since the level and quality of the received bursts depend on each mobile terminal. Averaging shall be performed separately. The value of the RMA associated to each mobile terminal (like the level of AGC and the precise timing) is stored and can be retrieved the next frame for an averaging.

It has to be noted that in principle (like in Hiperlan2), the access point is the master and decides, according to its scheduling mechanism, of the link adaptation result, i.e. of the PHY mode to be employed. As a consequence, all RMA information computed by mobile terminal on the downlink, shall be send back, over the Uplink to the Access Point. This procedure is identical to the one for the SINR parameter measured on the Downlink by Mobile Terminal.

The most simple procedure is to avoid the calculation of the SINR and to only implement a RMA criteria, i.e. a Link Adaptation criteria only dependent on the RMA.

In particular embodiment of the invention, a combination of the RMA criteria and the SINR or SNR criteria for Link Adaptation is implemented.

In practice the SINR criteria can be used 70-95% of the time, especially when a low SINR is observed.

However, if the SINR is high, it may be clever to check the RMA afterwards, in order to determine if the transmission channel is not distorted.

Therefore a first simple procedure is:
1—Checking the level of SINR;
2—If SINR is below a given threshold, then taking a decision on Link Adaptation immediately; and
3—If the SINR is above a given threshold, then checking the RMA and taking a decision on Link Adaptation.

A second simple procedure is:
1—Checking the level of RMA;
2—If RMA is below a given threshold, then taking a decision on Link Adaptation immediately.
3—If the RMA is above a given threshold, then checking the SINR and taking a decision on Link Adaptation.

The method according to the invention has the following advantages.

The RMA is very simple to implement.

It is a criteria very representative of the quality of the transmission channel, it combines the properties of both SINR and channel profile. It can be used as a "equivalent-AWGN-SINR", to predict the BER or PER quality of the transmission.

The gain by using this criteria is straightforward when considering the commonly employed "worst-case" scenario, since the dispersion of the BER performance with respect to the RMA is much reduced as compared to the SINR case. Hence, the global throughput can be improved.

Further improvement rely on the combination of the RMA with the SINR.

The invention claimed is:

1. Link adaptation process for selecting a physical layer mode used on a radio link for transmitting symbols of a message between two stations of a wireless communication system among a set of potential physical layer modes, the radio link being a-priori unknown and being able to match several profiles of fading channels, comprising:
evaluating the current radio link conditions; and
switching from a current physical layer mode to another physical layer mode by applying a criteria depending on the evaluated current radio link conditions, wherein
said evaluating comprises the calculation of a received modulation accuracy (RMA) for at least a part of the message, where the received modulation accuracy (RMA) is defined as the inverse of the expectation of a quadratic error for a predetermined number of symbols between equalized demodulated received symbol values and ideal symbol values and
the applying a criteria is at least partially dependent on the calculated received modulation accuracy (RMA) and the criteria for switching from the current physical layer mode follows an analysis that is independent from an a-priori knowledge of fading channel coefficients.

2. Link adaptation process according to claim 1, wherein each transmitted message comprises a sequence of known symbols, and the evaluating is carried out on at least a part of the sequence of known symbols, the ideal symbols values being taken equal to the known symbol values.

3. Link adaptation process according to claim 2, wherein each transmitted message comprises a known preamble and a payload part, the sequence of known symbols being at least a part of the preamble.

4. Link adaptation process according to claim 2, wherein each transmitted message comprises a preamble and a payload part, the payload part including known pilot symbols, the sequence of known symbols being at least some of the known pilot symbols.

5. Link adaptation process according to claim 1, wherein the evaluation step includes a step of determining each ideal symbol value depending on the received symbol value, the ideal symbol value being taken equal to a symbol value among a set of known potential symbol values which is the closest from the received symbol value by considering a predetermined "metric".

6. Link adaptation process according to any one of claims 1 to 5, wherein the received modulation accuracy (RMA) is normalised by the received signal power.

7. Link adaptation process according to claim 6, wherein the received modulation accuracy RMA is defined for the or each part of the message, as the inverse of the expectation of the quadratic error between a predetermined number of symbols between equalized demodulated received symbol values and ideal symbol values $\Delta^2(t,f,s)$ divided by the received signal power $p(t,f,s)$ according to the following formula:

$$RMA = \frac{1}{E\left[\frac{\Delta^2(t, f, s)}{p(t, f, s)}\right]}.$$

8. Link adaptation process according to claim 7, wherein an Orthogonal Frequency Division Multiplexing (OFDM) modulation scheme is implemented, the message being divided into frames, and in that the received modulation accuracy RMA is defined by the formula:

$$RMA = \frac{N_f N_p \cdot K_f}{\sum_{t_1=1}^{N_f} \sum_{t_2=1}^{N_p} \sum_{s=1}^{N_s} \left[\sum_{f=1}^{K_f} \{(I(t_1, t_2, f) - I_0(t_1, t_2, f))^2 + (Q(t_1, t_2, f) - Q_0(t_1, t_2, f))^2\}/P_0\right]}$$

where: $(I_0(t,f,s),Q_0(t,f,s))$ is the ideal (reference) symbol $A_0$ for the time t, frequency f and space s, $(I(t,f,s),Q(t,f,s))$ is the equalized demodulated received symbol A at the time t, frequency f and space s $N_f$ is the number of frames for the measurement, $N_p$ is the length of the packet in the frame, in number of OFDM symbols, $N_s$ is the number of space diversity composing the receive signal, $P_0$ is the average power of the constellation within one OFDM symbol, and $K_f$ is the number of sub-carriers of the OFDM symbols.

9. Link adaptation process according to claim 8, wherein $P_0$ is the average power of the signal within an OFDM symbol and is approximated by:

$$P_0 = E[\rho^2(t_1, t_2, f)] = \frac{\sum_{f=1}^{K_c} \rho^2(t_1, t_2, f)}{K_c}$$

where $\rho^2(t_1,t_2,f)$ is the channel estimation coefficient on sub-carrier f in OFDM symbol $t_2$, in frame $t_1$ but with $t_1$, and $t_2$ being fixed.

10. Link adaptation process according to claim 6, wherein the received modulation accuracy RMA is defined, for the or each part of the message, as the inverse of the expectation of the quadratic error between a predetermined number of symbols between equalized demodulated received symbol values and ideal symbol values $\Delta^2(t,f,s)$ divided by the expectation of the received signal power $p(t,f,s)$ according to the following formula:

$$RMA = \frac{1}{\frac{E[\Delta^2(t,f,s)]}{E[p(t,f,s)]}} = \frac{E[p(t,f,s)]}{E[\Delta^2(t,f,s)]}.$$

11. Link adaptation process according to claim 10, wherein an Orthogonal Frequency Division Multiplexing (OFDM) modulation scheme is implemented, the message being divided into frames, and in that the received modulation accuracy RMA is defined by the formula:

$$RMA = \frac{N_f N_p \cdot K_f P_0}{\sum_{t_1=1}^{N_f} \sum_{t_2=1}^{N_p} \sum_{s=1}^{N_s} \left[ \sum_{f=1}^{K_f} \{(I(t_1,t_2,f) - I_0(t_1,t_2,f))^2 + (Q(t_1,t_2,f) - Q_0(t_1,t_2,f))^2\} \right]}$$

where $(I_0(t,f,s),Q_0(t,f,s))$ is the ideal (reference) symbol $A_0$ for the time t, frequency f and space s, $(I(t,f,s),Q(t,f,s))$ is the equalized demodulated received symbol A at the time t frequency f and space s, $N_f$ is the number of frames for the measurement, $N_p$ is the length of the packet in the frame, in number of OFDM symbols, $N_s$ is the number of space diversity composing the receive signal, $P_0$ is the average power of the constellation for the whole averaging period, and $K_f$ is the number of sub-carriers of the OFDM symbols.

12. Link adaptation process according to claim 11, wherein $P_0$ is the average power of the signal for the whole averaging period and can be approximated in this case by:

$$P_0 = E[\rho^2(t_1, t_2, f)] = \frac{\sum_{t_1=1}^{N_f} \sum_{t_2=1}^{N_p} \sum_{f=1}^{K_c} \rho^2(t_1, t_2, f)}{N_f N_p \cdot K_c}$$

where $\rho^2(t_1,t_2,f)$ is the channel estimation coefficient on sub-carrier f, in OFDM symbol $t_2$, in frame $t_1$.

13. Link adaptation process according to any one of claims 1 to 5, wherein the message is divided into frames and the received modulation accuracy (RMA) is calculated for at least two frames of the message and is equal to the average value of the received modulation accuracy RMA of each frame.

14. Link adaptation process according to any one of claims 1 to 5 wherein the criteria is only dependent on the received modulation accuracy (RMA).

15. Link adaptation process according to any one of claims 1 to 5, wherein the evaluation step of the current radio link conditions comprises the calculation of the at least one signal ratio among the Signal to Noise Ratio (SNR) or the Signal to Noise and Interference Ratio (SINR) of the transmission, and in that the criteria is dependent on the received modulation accuracy (RMA) and on said at least one signal ratio among the Signal to Noise Ratio (SNR) or the Signal to Noise and Interference Ratio (SINR) of the transmission.

16. Link adaptation process according to claim 15, wherein the implementation of the criteria comprises:
 first comparing the signal ratio to a given threshold, and next
 if the signal ratio is below the given threshold, switching from the current physical layer mode to another physical layer mode by applying a sub-criteria depending on the signal ratio,
 if the signal ratio is above the given threshold, switching from the current physical layer mode to another physical layer mode by applying a sub-criteria depending on the received modulation accuracy (RMA).

17. Link adaptation process according to claim 15, wherein the implementation of the criteria comprises:
 first comparing the received modulation accuracy (RMA) to a given threshold, and next
 if the received modulation accuracy (RMA) is below the given threshold, switching from the current physical layer mode to another physical layer mode by applying a sub-criteria depending on the received modulation accuracy (RMA),
 if the received modulation accuracy (RMA) is above the given threshold, switching from the current physical layer mode to another physical layer mode by applying a sub-criteria depending on the signal ratio.

18. Wireless communication system comprising:
 means for implementing a link adaptation process according to any one of claims 1 to 5.

19. Receiver adapted to be used in a wireless communication system according to claim 18, further comprising:
 means of calculating a received modulation accuracy (RMA), the received modulation accuracy (RMA) being defined as the inverse of the expectation of a quadratic error for a predetermined number of symbols between equalized demodulated received symbol values and ideal symbol values.

* * * * *